United States Patent [19]

Gehweiler

[11] 3,731,114

[45] May 1, 1973

[54] TWO PHASE LOGIC CIRCUIT

[75] Inventor: William Frederick Gehweiler, Moorestown, N.J.

[73] Assignee: RCA Corporation, New York, N.Y.

[22] Filed: July 12, 1971

[21] Appl. No.: 161,479

[52] U.S. Cl. ................307/205, 307/208, 307/221 C

[51] Int. Cl. ........................H03k 19/08, G11c 19/00

[58] Field of Search ......................307/205, 208, 221, 307/304; 328/37

[56] References Cited

UNITED STATES PATENTS

| | | | |
|---|---|---|---|
| 3,626,202 | 12/1971 | Pound | 307/304 X |
| 3,610,951 | 10/1971 | Howland | 328/37 X |
| 3,395,292 | 7/1968 | Bogert | 307/304 X |
| 3,524,077 | 8/1970 | Kaufman | 307/221 C |
| 3,551,693 | 12/1970 | Burns | 307/205 |
| 3,573,490 | 4/1971 | Sevine, Jr. et al. | 307/304 X |
| 3,582,975 | 6/1971 | King | 307/221 C X |
| 3,601,627 | 8/1971 | Booher | 307/205 |
| 3,609,412 | 9/1971 | Okumura | 307/304 |

*Primary Examiner*—John Zazworsky
*Attorney*—H. Christoffersen

[57] ABSTRACT

A gate network which permits two levels of logic to be performed by interconnected gate networks which are controlled by the same phase.

5 Claims, 3 Drawing Figures

INVENTOR.
William F. Gehweiler
BY
G. Donald Weber Jr.
ATTORNEY

INVENTOR.
William F. Gehweiler
BY
G. Donald Weber, Jr.
ATTORNEY

INVENTOR.
William F. Gehweiler
BY
J. Donald Weber, Jr.
ATTORNEY

TWO PHASE LOGIC CIRCUIT

BACKGROUND OF THE INVENTION

In utilizing metallic oxide semiconductor (MOS) technology, many standard or classic logic functions are performed. It has been determined that MOS technology occasionally produces certain disadvantages in logic circuitry wherein additional components are required in order to perform the classic logic functions. For example, the operation of many logic systems using MOS technology requires two (or more) phases to prevent reverse signal flow in the circuits. The two-phase operation introduces desired delays into the circuit operation to permit performance of synchronous logic functions.

One of the typical functions which is produced using MOS technology is a shift register. Shift registers, per se, are well-known in the art. In addition, shift registers utilizing MOS technology are also known in the art. However, present two-phase, ratioless methods which use a single MOS device type (either P-MOS or N-MOS) have the restriction that only a single level of logic can be performed during any phase. Consequently, many known shift registers using MOS techniques and technology are relatively cumbersome. Moreover, these registers do not provide suitable complementary signals for each stage within a single phase.

SUMMARY OF THE INVENTION

This invention relates to MOS technology as utilized in providing logic networks. Moreover, this invention provides an intermediate gate which may be associated with other logic circuitry, such as a shift register, whereby two levels of logic are performed during the same phase. The basic improvement embodied in the intermediate gate described herein permits greater flexibility in two-phase MOS technology.

Essentially, the invention incorporates an intermediate gate which operates during the same phase as a logic network stage associated therewith. The aforementioned stage and the intermediate gate produce output signals during the same phase. Moreover, the instant invention permits combinatorial logic arrangements not shown or described in the prior art.

DESCRIPTION OF PREFERRED EMBODIMENTS

Figure 1:
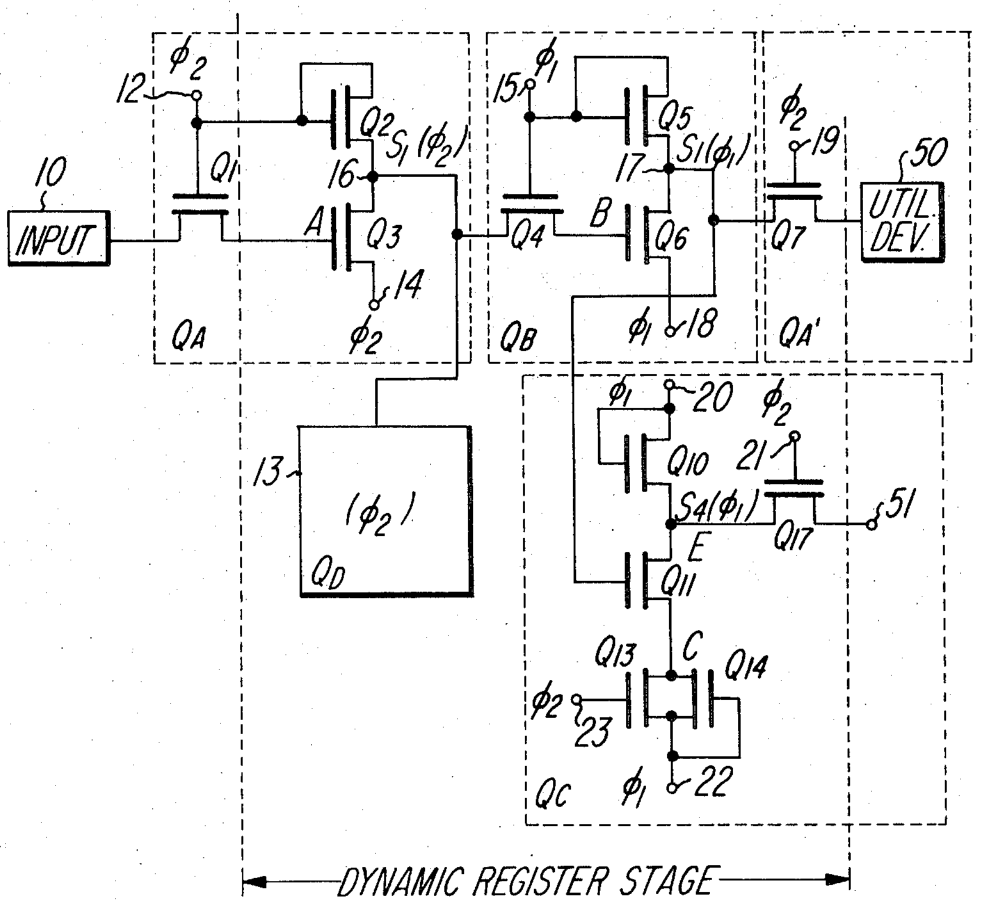
FIG. 1 is a schematic diagram of one embodiment of the instant invention.

Referring now to FIG. 1, there is shown a schematic diagram of one embodiment of the instant invention. Stages QA, QB and QA′ represent a typical shift register using MOS technology. Stages QC and QD represent the intermediate gates which form the instant invention.

In each of the stages aforesaid, there are a plurality of "active" elements which are in the nature of semiconductors. In particular, the semiconductors may be of the MOS type, which may be produced in bulk silicon, or silicon on an insulated substrate, e.g. sapphire, by way of example. Either P–MOS or N–MOS type semiconductors can be utilized. The voltage levels will have to be reversed, however, for the different types of devices. In the instant description all of the active elements are defined as P–MOS devices and the operation of the circuit is described accordingly. It is to be understood that other types of semiconductor devices can be utilized be well.

A detailed description of the operation of MOS devices is not presented inasmuch as this type of operation is known in the art. However, each of the P–MOS devices shown and described herein is defined to be a three terminal device. Two of the terminals which correspond generally to the source and drain electrodes of a field effect transistor (FET), are utilized to define a conduction path therebetween. A third electrode generally corresponding to the gate electrode of an FET controls the conduction through the aforesaid conduction path.

In a P–MOS device a positive signal is supplied to the gate or control electrode to render the device nonconductive. That is, if the gate or control electrode is positive with respect to the source electrode of the device, the P–MOS device is nonconductive. Contrariwise, if the gate or control signal is negative with respect to the source electrode, the P–MOS device is rendered conductive. The opposite operating conditions occur for N–MOS devices.

In stage QA, MOS device Q1 has one terminal of the conduction path thereof connected to input source 10. MOS device Q1 is defined as the transmission gate or input device for stage QA. The other end of the conduction path of semiconductor Q1 is connected to node A. While only one input device is shown, one or more input or transmission gates may be utilized per stage. If a plurality of input gates are utilized, additional combinatorial logic functions may be achieved.

MOS devices Q2 and Q3 are connected so that the conduction paths thereof are in series. The common junction 16 of devices Q2 and Q3 is the output terminal for stage QA. The control electrode of device Q3 is connected to node A, noted supra. The other terminal of device Q3 is connected to terminal 14 and receives the $\phi 2$ signal. The $\phi 2$ signal is also applied to the other terminal of device Q2, to the control electrode thereof, and to the control electrodes of the input transmission gates in stage QA.

Stage QB has a similar configuration to stage QA. However, the input transmission gate semiconductor Q4 has the control electrode thereof connected to receive the $\phi 1$ signal. One terminal of the conduction path of device Q4 is connected to output terminal 16 of stage QA. The other terminal of the conduction path of semiconductor Q4 is connected to the control electrode of semiconductor Q6 at node B. Semiconductor devices Q5 and Q6 have the conduction paths thereof connected in series with the common junction thereof forming output terminal 17. The other terminals of devices Q5 and Q6 receive the $\phi 1$ signal as do the control electrodes of devices Q4 and Q5 and any other input transmission gates in stage QB. The $\phi 1$ signal is supplied at terminals 15 and 18.

Output terminal 17 of stage QB is connected to one terminal of the conduction path of transmission gate Q7 in stage QA′ wherein stage QA′ may be an iterative circuit similar to stage QA. Conversely, stage QA' may include any suitable utilization device 50 which is connected to the other terminal of the conduction path of semiconductor Q7. The control electrode of semiconductor device Q7 is connected to terminal 19 to receive the $\phi 2$ signal.

The above-described circuit is essentially a shift register of known configuration. However, most of the known shift registers include a constant voltage source which is connected across the opposite terminals of the MOS devices having serially connected conduction paths. The configuration of this invention is known as ratioless MOS technology and uses only the phase or clock signals. The standard "ratio-type" inverter is not used herein.

Stage QC is a $\phi 1$ circuit which includes a plurality of MOS devices Q10 and Q11 connected in series with the parallel combination of the MOS devices Q13 and Q14. In particular, the conduction paths of the semiconductors are connected together and the control electrodes are connected to suitable sources. For example, the control electrode of transistor Q11 is connected to terminal 17 of stage QB to receive the output signal S1 ($\phi 1$) therefrom. The control electrode and one terminal of the conduction path of semiconductor Q10 are connected to terminal 20 to receive the $\phi 1$ clock signal. The control electrode and one terminal of the conduction path of semiconductor Q14 are connected to receive the $\phi 1$ signal at terminal 22. The control electrode of semiconductor Q13 is connected to terminal 23 to receive the $\phi 2$ clock signal. The common junction of the conduction paths for semiconductors Q11, Q13 and Q14 is designated as node C.

A suitable output transmission gate Q17 has the conduction path thereof connected from node E to output terminal 51 which may be connected to any suitable utilization device. Node E is defined as the common junction of the conduction paths of semiconductors Q10 and Q11. The control electrode of device Q17 is connected to terminal 21 to receive the $\phi 2$ signal. Thus, output signals are supplied to utilization device 50 and terminal 51 concurrently in response to the $\phi 2$ signal.

Stage QD, represented by block 13, has an input terminal connected to output terminal 16 of stage QA. Stage QD is defined to be $\phi 2$ circuit wherein operation thereof is controlled by the $\phi 2$ signal. The circuit configuration of stage QD may be similar to that of stage QC (when the phase signal is reversed) and is not reproduced herewith.

Figure 2:
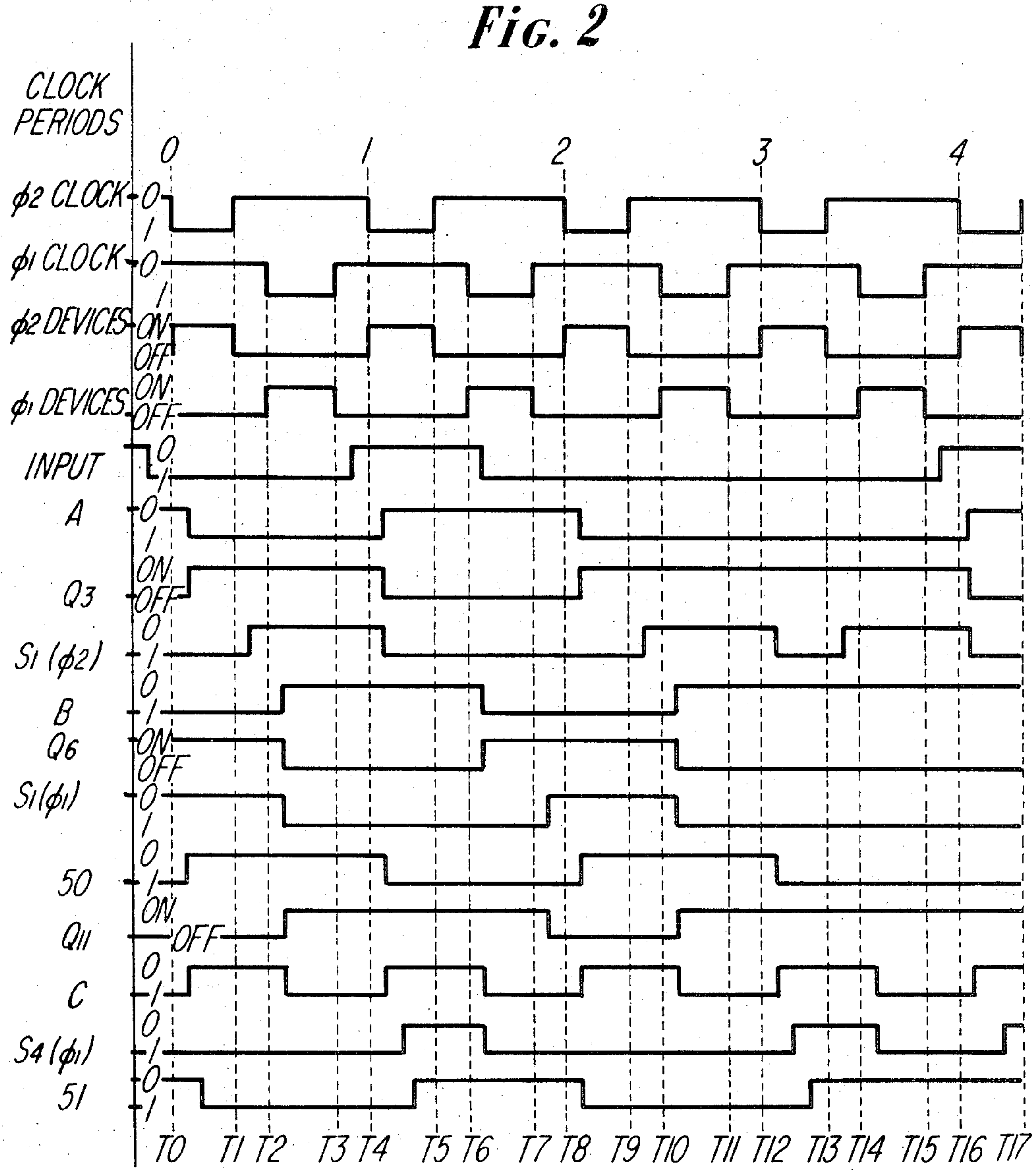
FIG. 2 is a timing diagram showing the signals supplied to and by the circuit of FIG. 1.

In describing the operation of the circuit shown in FIG. 1, concurrent reference is made to the timing diagram shown in FIG. 2. This diagram is somewhat idealized insofar as waveshapes are concerned. In addition, certain minor signal delays are exaggerated for purposes of clarity and explanation. In the timing diagram, there are shown the signals supplied to and by the circuit shown in FIG. 1. The signals are labeled to indicate the type of signal and the terminal at which the signal is provided. The signals vary between the ground (or zero volt) level and the −V voltage level. In operation, as defined herein, the zero level may represent a binary 0 logic signal while the −V signal may represent the binary 1 logic signal It is seen that the phase or clock signals ($\phi 1$ and $\phi 2$) are arranged so that the respective binary 1 logic signals (i.e. the −V levels) are spaced apart. In other words, the binary 0 portion of the phase signals overlap intermediate the binary 1 signals produced by the two-phase signals. This arrangement permits a certain "dead-time" during which a quiescent signal condition is achieved. The phase signals are supplied to the terminals as shown in FIG. 1.

The input signal also varies from the 0 to −V voltage level (i.e. binary 0 to binary 1). This signal is supplied by input source 10 which may be an external source or may, in fact, be another stage similar to those shown. The input signal, in synchronism with the $\phi 1$ signal, is chosen arbitrarily and is illustrative only.

Regarding the waveshapes which relate to the respective semiconductor devices, the high level signal indicates that the respective semiconductor is in the "-conduction" state. This is, the semiconductor is enabled for conduction by the applied phase signal but actual conduction of the semiconductor is determined by the other signals applied to the semiconductor device. For example, semiconductor Q1 is enabled for conduction when the negative $\phi 2$ signal is supplied to the control electrode (see time periods T0 to T1). However, the degree and direction of conduction by semiconductor Q1 is determined by the signals at the input and at node A. That is, actual conduction occurs only when one of the input signals or the signal at node A is a binary 0 (i.e. ground potential) while the other of these signals is a binary 1. Likewise, semiconductor Q3 is enabled for conduction when the $\phi 2$ signal is at the relatively positive level. However, actual conduction by semiconductor Q3 occurs only when the signal at node A is a binary 1 (i.e. −V volts). In other words, when the $\phi 2$ signal is in the binary 1 (or −V) condition, semiconductors Q1 and Q2 are in the conduction state. However, when the $\phi 2$ signal switches to the binary 0 (or ground) condition, semiconductors Q1 and Q2 are clearly nonconductive regardless of the other signal conditions. On the other hand, semiconductor Q3 is in the conduction state only when the signal at node A is a binary 1 and is clearly nonconductive when the signal at node A is a binary 0 (regardless of the $\phi 2$ signal). The conduction waveform for the semiconductor devices does not represent, in this showing, any particular voltage level or the like. This type of signal representation of the semiconductor operation is utilized throughout in FIG. 2.

Furthermore, as will be seen, the status or level of signal S1($\phi 2$) at terminal 16 is a function of both the input signal (as reflected at node A) and the $\phi 2$ signal. That is, when the input signal at source 10 is relatively positive (i.e. ground potential or binary 0) and the $\phi 2$ signal is relatively negative (i.e. −V potential or binary 1) semiconductor Q1 is conductive and transmits the positive input signal to node A. Of course, if the signal at node A is relatively positive (e.g. ground potential) and the input signal is at the −V level, semiconductor Q1 selectively permits the transmission of the −V signal to node A during the −V signal level of the $\phi 2$ signal. This operation is permitted because of the bidirectional conduction of semiconductor Q1 which is, effectively, primed by the −V signal at the gate electrode thereof. Of course, when a ground level signal is applied to the gate electrode thereof, semiconductor Q1 is nonconductive and node A remains at substantially the previously established level except for any signal deterioration which occurs as a result of leakage.

As is seen until time period T0, semiconductors Q1 and Q2 are not in the conduction state inasmuch as the $\phi 2$ signal supplied to the control electrodes of semiconductors Q1 and Q2 is at the ground or binary level. Moreover, in the illustrative case, the input signal is a ground potential or binary 0 signal until immediately prior to time T0. The signal at node A (i.e. the control electrode of semiconductor Q3) is also a binary 0 signal until immediately subsequent to time T0. That is, until semiconductor Q1 switches to the conduction state at time T0 (i.e., when the $\phi 2$ signal goes negative) the input signal is not supplied to node A and node A remains at the previously established ("prior history") signal level. When the signal applied to node A via semiconductor Q1 causes the node to be precharged to the binary 0 (i.e. relatively positive) level, semiconductor Q3 is essentially nonconductive regardless of the status of the $\phi 2$ signal. When semiconductor Q3 is nonconductive, the output signal S1($\phi 2$) at terminal 16 is a relatively negative signal (or −V potential). This signal condition exists inasmuch as terminal 16 has been precharged to the −V voltage level via semiconductor Q2. That is, semiconductor Q2 was in the conduction state, in response to the −V signal supplied by the $\phi 2$ clock, to remove any "prior history" positive signal at terminal 16. Since terminal 16 has been precharged to the −V level (prior to time T0) and since semiconductor Q3 remained nonconductive (in response to a prior high level, i.e. ground potential, input signal at node A), output signal S1($\phi 2$) remains at the −V signal level.

However, when the input signal switches to the −V level, as for example, just prior to time period T0, certain operating changes occur. For example, when the $\phi 2$ signal switches to the −V level at time T0, semiconductor Q1 is in the conduction state. Thus, after the inherent delay in transmitting the input signal through semiconductor Q1, the signal at node A switches to the −V voltage level (i.e. binary 1) in response to the input signal. The −V voltage level of the $\phi 2$ signal during time period T0 – T1, in conjunction with the −V signal at node A, causes semiconductor Q3 to be in the conduction state (although substantially no conduction occurs) whereby the −V signal is maintained at terminal 16. When the $\phi 2$ signal switches to ground potential at time T1, semiconductor Q3 remains conductive in view of the −V signal at node A and the ground potential signal at terminal 14. Thus, terminal 16 is discharged to ground through the conduction path of semiconductor Q3. Due to the inherent delay produced by semiconductor Q3, node 16 charges to the ground potential level between time period T1 and T2 (i.e. shortly after the $\phi 2$ signal switches to ground level). In operation, as suggested in the illustrative timing diagram of FIG. 2, the signal at terminal 16, i.e. S1($\phi 2$), remains at the ground (binary 0) level until after the $\phi 2$ signal switches to the −V level. That is, the input signal switches to the ground level between time periods T3 and T4. When the $\phi 2$ signal switches to the −V level (at time T4), semiconductor Q1 assumes the conduction state and the relatively positive (i.e. ground level) input signal is transmitted to node A, thereby effectively rendering semiconductor Q3 nonconductive. Meanwhile, semiconductor Q2 is operative to precharge terminal 16 to the −V level during the application of the −V phase of the $\phi 2$ signal. Due to the inherent operating delay in transmitting the input signal to node A via semiconductor Q1 in response to the $\phi 2$ signal, semiconductor Q3 and output signal S1($\phi 2$) are switched shortly after time period T4. The S1($\phi 2$) signal remains at the −V level until time period T9 as described hereinafter.

Referring now to time period T7 through T15, the input signal is at the −V level while the $\phi 2$ signal switches, periodically, from the −V level to the ground potential level. Also, the signal at node A is at ground potential from time period T7 until shortly after time period T8. Clearly, when the $\phi 2$ signal is at the ground potential level (e.g. time periods T7 to T8, T9 to T12 and T13 to T15 inclusive), semiconductor Q1 is reverse biases and nonconductive. However, during the time periods when the $\phi 2$ signal is at the −V level (e.g. time periods T8 and T9 and T12 to T13), semiconductor Q1 is primed to the conduction state and, essentially, enabled so that the input signal can be transmitted thereby if the appropriate input signal level were supplied.

As noted supra, at time period T7 node A is at the ground level as a result of the signal conditions established at time period T4. The signal level at node A remains unchanged until after the $\phi 2$ signal switches to the −V level at time period T8. That is, when the $\phi 2$ signal goes to the −V level, semiconductor Q1 is enabled and the signal at node A switches (after inherent delay) to the −V level in response to the −V level input signal. The signal level at node A will remain at the −V level in the absence of a change in the input signal level. That is, by definition, semiconductor Q1 is not actually conductive when supplied with substantially identical signals at the electrodes thereof, whereby the signal level at node A remains at the −V or binary 1 level previously established at time period T8. Likewise, if the input signal had remained at the binary 0 or ground potential level, the node A signal level also would have remained at the ground potential level. In fact, when the $\phi 2$ signal switched to the −V level and primed semiconductor Q1, the signal level at node A would have been reinforced or "refreshed." The circuit operation suggested subsequent to time period T15 is similar to previously described operation and is not repeated in detail.

Also, referring to time periods T7 through T16, semiconductor Q3 is in the conduction state from slightly subsequent to time period T8 until subsequent to time period T16. The state of semiconductor Q3 is established by the signal level at node A which switches from the ground level to the −V level just subsequent to time period T8 as noted supra. Even though semiconductor Q3 is in the conduction state, there is no actual conduction thereby when the $\phi 2$ signal is in the −V phase. However, when the $\phi 2$ signal switches to the ground level (binary 0), for example at time periods T9 and T13, semiconductor Q3 is rendered conductive and, after short delays, signal (S1($\phi 2$) at terminal 16 switches to the ground level. Conversely, when the $\phi 2$ signal returns to the −V level at time periods T12 and T16, the S1($\phi 2$) signal also returns to the −V level after short delays.

The above-description relates primarily to stage QA. However, substantially similar operation pertains in any $\phi 2$ stage such as stage QD. Detailed descriptions of other $\phi 2$ stages are not deemed essential.

While the $\phi 2$ stages are operating as described, the $\phi 1$ stages are also operating in response to the $\phi 1$ signal. Generally, the operation is similar but different timing is provided since the $\phi 1$ and $\phi 2$ signals are each out of phase with the other. In the operation of stage QB, when the $\phi 1$ signal is at the −V level, semiconductors Q4 and Q5 are in the conduction state. When semiconductor Q4 is in the conduction state, node B is charged to the signal level exhibited at terminal 16. Thus, signal S1($\phi 2$) becomes the input signal for stage QB. As noted supra, the signal at terminal 16 is at the −V level (binary 1) until switched to the ground level (binary 0) between time periods T1 and T2. Thus, node B remains at the −V level until at least time T2. AT time T2 the $\phi 1$ signal achieves the −V level such that semiconductor Q4 is in the conduction state. Consequently, after delay, node B receives the ground level signal S1($\phi 2$) which was established by the prior operation of semiconductors Q1 and Q3 of stage QA during time periods T0 – T2. Concurrently, semiconductor Q6 is in the conduction state through time period T2 as a result of the −V level signal at node B. When the signal at node B switches to ground potential shortly after time period T2, semiconductor Q6 is rendered nonconductive. In accordance with the concurrent conduction of semiconductor Q6 and the application of the ground level $\phi 1$ signal, signal S1($\phi 1$) at terminal 17 is also ground potential until shortly after time period T2.

The conditions established shortly after time period T2 remain unchanged until shortly after time period T4 at which time signal S1($\phi 2$) switches to the binary 1 level. Consequently, at the next application of the −V level of the $\phi 1$ signal, at time period T6, semiconductor Q4 is rendered conductive such that the −V level input signal is applied to node B after the standard operating delay of the transmission device. When the −V signal is applied to node B, semiconductor Q6 is switched to the conduction state. However, no actual conduction occurs in semiconductor Q6. Moreover, semiconductor Q5 is placed in the conduction state with the application of the −V phase of the $\phi 1$ clock signal. Consequently, node 17 is essentially precharged to the −V level. Inasmuch as terminal 17 was already at the −V level, a "refreshing" of the signal condition at terminal 17 may be suggested.

At time period T7 the $\phi 1$ signal switches to the ground level such that semiconductors Q4 and Q5 are essentially rendered nonconductive. However, the $\phi 1$ ground level signal is applied at terminal 18 of semiconductor Q6. This signal, in conjunction with the −V signal level at the control or gate electrode of semiconductor Q6, renders this semiconductor conductive such that after the standard operating delay time, a signal S1($\phi 1$) at terminal 17 switches to the ground level or binary 0 signal. Thus, it is seen that the output signal S1($\phi 2$) detected during time period T2 – T4 and produced by the input signal prior to time T0 produces the output signal S1($\phi 1$) which is detected between time period T8 and T10.

Again, between time period T9 and T10 the input signal S1($\phi 2$) switches from the −V level to the ground potential level. Also, at time period T10 and $\phi 1$ signal switches to the −V level. This combination of signals causes semiconductors Q4 and Q5 to be in the conduction state. Consequently, shortly after time period T10 the signal level at node B switches to ground level and, consequently, semiconductor Q6 is rendered nonconductive. Likewise, output signal S1($\phi 1$) at terminal 17 also switches to the −V volts level. That is, semiconductor Q5 operates to charge terminal 17 to the −V level while semiconductor Q6 is rendered nonconductive.

The input signal S1($\phi 2$) switches to the −V level shortly after time period T12 but returns to the ground level between time periods T13 and T14. During the interval when signal S1($\phi 2$) is at the −V level, transistor Q4 was nonconductive whereby node B was not supplied with the −V signal. Consequently, node B remains at the ground level through time period T16. In addition, this signal condition causes semiconductor Q6 to remain in the nonconductive condition. As a consequence, terminal 17 is never supplied with a ground level signal via either of semiconductors Q5 or Q6 and the output signal S1($\phi 1$) remains at the −V level through time period T16.

In general, the output signal S1($\phi 1$) at terminal 17 is a function of the conduction of semiconductors Q4, Q5 and Q6. When semiconductor Q5 is in the conduction state due to the application of the −V level phase of the $\phi 1$ signal, terminal 17 is precharged to the −V level. That is, any relatively positive prior history signal at terminal 17 is discharged through semiconductor Q5 to terminal 15. Moreover, conduction, if any, by semiconductor Q6 aids in precharging terminal 17 to the −V level, as well. Conversely, when the $\phi 1$ signal is at ground level, semiconductor Q5 is rendered nonconductive while semiconductor Q6 is rendered conductive only by the application of a −V signal at node B. When semiconductor Q6 is, thus, rendered conductive (e.g. time periods T6 – T7), terminal 17 is, effectively, connected to ground and output signal S1($\phi 1$) is ground potential. Thus, it is seen that a ground level signal at node A (as established by source 10) produces a ground level output signal at utilization device 50 one clock period later while the complement output signal is produced at terminal 51 as discussed infra.

The output signal S1($\phi 1$) is selectively applied to utility device 50 which may be an external circuit or the like via a transmission gate comprising semiconductor Q7. Semiconductor Q7 and utility device 50 may comprise an additional stage Q'A of the $\phi 2$ type. Semiconductor Q7 is selectively rendered conductive by the application of a −V level $\phi 2$ signal to the gate electrode thereof. For example, at time period T0 the $\phi 2$ signal supplied a −V level signal which places semiconductor Q7 in the conduction state. Inasmuch as signal S1($\phi 1$) is at ground level at time period T0 semiconductor Q7 exhibits actual conduction wherein, after appropriate delay, utility device 50 is rendered nonconductive. Utility device 50 will remain nonconductive until actively switched, as for example at time period T4, by the application of a −V level signal by the $\phi 2$ signal concurrent with a −V level S1($\phi 1$) signal. That is, the −V level S1($\phi 1$) signal is supplied to utility device 50 via semiconductor Q7 and utility device 50 may be considered to be conductive.

Utility device 50 will remain conductive until actively switched again, for example in response to the concurrent application of a ground level S1(φ) signal and a −V level φ2 signal at time period T8. Again, the condition of utility device 50 remains unchanged until actively switched by the concurrent application of a −V level S1(φ1) signal and a −V level φ2 signal, as for example at time period T12.

From this discussion it is obvious that complementary signals during any particular phase are not provided. Rather a phase cycle is required in order to obtain complementary signals. The mere application of an output signal to an inverter of the standard type would require an incompatibility inasmuch as the circuitry described hereinabove is ratioless-type circuitry while the standard inverter requires ratio-type circuitry. Consequently, a suitable intermediate circuit such as stage QC for producing a complementary output signal using ratioless MOS technology is provided.

In order to implement this operation, output signal S1(φ1) at terminal 17 is supplied to the control (i.e. gate) electrode of semiconductor Q11. The conduction path of semiconductor Q11 is connected between nodes C and E. Nodes C and E are effectively precharged to the −V level whenever the −V level of the φ1 signal is applied to terminals 20 and 22. That is, the −V level of the φ1 signal causes semiconductors Q10 and Q14 to be in the conduction state so that any prior history signals at nodes C and E are discharged to the −V signal level. Of course, when the ground level φ1 signal is applied, semiconductors Q10 and Q14 are nonconductive.

Node C is periodically charged to ground potential when the −V level of the φ2 signal is applied to the control electrode of semiconductor Q13 while a ground level φ1 signal is applied concurrently at terminal 22, as for example at time periods T0, T4, T8, T12 and T16. Moreover, in view of the phase relation of the φ1 and φ2 signals, node C will be discharged to the −V level, as noted supra by the signal combination at time periods T2, T6, T10 and T14.

Consequently, depending upon the conduction or not of transistor Q11, the signal condition at node E may be altered by the signal at node C. For example, the S4(φ1) signal at node E is at the −V level until after time period T4 as a result of the prior conduction of semiconductor Q10 (and precharging of node E) in response to the −V level of the φ1 signal and the prior nonconduction of semiconductor Q11. Typical of the prior operation, at time period T2, the −V level φ1 signal is applied to semiconductor Q14 whereby the voltage at node C is precharged to the −V level. Semiconductor Q11 is nonconductive through time period T2 in response to the application of a ground level output signal S1(φ1) at terminal 17. Moreover, semiconductor Q10 is in the conduction state due to the application of the −V level φ1 signal at time period T2 whereby node E [and the S4(φ1) signal] remains at the −V level.

During time period T0 through T2 semiconductor Q13 is rendered conductive since the −V level of the φ2 signal is applied to that gate electrode thereof and the ground level of the φ1 signal is supplied at terminal 22. However, semiconductor Q11 is rendered nonconductive by the application of a ground level signal S1(φ1) at the control electrode thereof. Consequently, node E remains at the −V level due to the previous precharge condition established by conduction of semiconductor Q10.

Conduction of semiconductors Q14 and Q10 during time periods T2 – T3, T6 – T7, T10 – T11 and T14 – T15 due to the −V level φ1 signal reestablishes the −V level at nodes C and E. Thus, it is seen that the voltage at node C varies periodicaLly as a function of the phase signals supplied thereto. However, this signal condition is effective at node E only as a result of conduction by semiconductor Q11, and semiconductor Q11 is in the conduction state only when the signal S1(φ1) is at the −V level. That is, even if semiconductor Q11 is conductive during the −V level of the φ1 phase signal, both nodes C and E are at the −V level due to the operation of semiconductors Q10 and Q14. Thus, even though semiconductor Q11 is in the conduction state between time periods T2 and T3 because of the level of signal S1(φ1), the output signal S4(φ1) at node E does not switch to the ground level until after time period T4. That is, at time period T4 semiconductor Q13 is rendered conductive by the application of the −V level φ2 signal to the gate electrode thereof while a ground level signal φ1 is applied at terminal 22. Conduction of semiconductor Q13 at time period T4 causes the ground level signal at terminal 22 to be supplied to node C after inherent operational delay of semiconductor Q13. Inasmuch as semiconductor Q11 is also conductive, the ground level signal at node C is also supplied to node E after a delay. Similarly, at time period T6 and φ1 signal at terminals 20 and 22 assumes the −V level. Consequently, the signal level at each of nodes C and E shortly switches to the −V level as a result of conduction by semiconductors Q10 and Q14.

Semiconductor Q11 continues in the conduction state until the signal S1(φ1) from stage QB switches to ground level between time periods T7 and T8 as described supra. (That is, semiconductor Q6 is conductive such that the ground level of the φ1 signal applied at terminal 18 is transferred to terminal 17.) The ground level signal S1(φ1) causes semiconductor Q11 to be rendered nonconductive between time periods T7 and T8. As a consequence of the status of semiconductor Q11, output signal S4(φ1), which was switched to the −V level shortly after time period T6, remains at the −V level until after time period T12 even though the signal at node C was at ground level between time periods T8 and T10.

Again, between time periods T10 and T11, semiconductor Q11 is placed in the conduction state as the result of the signal S1(φ1) being switched to the −V level by the operation of stage QB. Consequently, when semiconductor Q13 conducts a ground level signal from terminal 22 to node C, the ground level signal is also conducted, via semiconductor Q11, to node E. Thus, shortly after time period T12 (i.e. the time period when the φ2 signal switches to the −V level), the output signal S4(φ1) also switches to the ground level. Of course, when the φ1 signal goes to the −V level, semiconductor Q14 charges node C to the −V level. This signal condition is also reflected at node E (via semiconductor Q10) and the S4(φ1) signal returns to the −V level.

This type of operation continues as dictated by the $\phi 1$ and $\phi 2$ signals, the input signal and the signals generated by the circuit. Additional description, for example as related to the signal operation at time period T16 is not deemed necessary.

The output signal at terminal 51 is a function of the signal at node E and the $\phi 2$ signal. That is, semiconductor Q17 is conductive only during the −V level of the $\phi 2$ signal. Consequently, the output signal at terminal 51 is a ground level signal until shortly after time period T0 inasmuch as the signal at terminal E was initially, i.e. at a time not shown in FIG. 2, a high level signal which was transmitted to terminal 51 while semiconductor Q17 was conductive. The signal at output terminal 51 remains at this level (unless an output circuit is arranged to produce a different result) since the terminal is isolated from the remainder of the circuit while semiconductor Q17 is nonconductive.

At time period T0 semiconductor Q17 is rendered conductive by the application of the −V level of the $\phi 2$ signal. The signal S4($\phi 1$) at node E is a −V signal at time period T0 whereby this voltage is transmitted through semiconductor Q17 to terminal 51. Again, terminal 51 remains at the level to which it was charged (i.e. −V level) in the absence of additional conduction by semiconductor Q17 or an outside circuit influence. Thus, it is seen that the signal at terminal 51 does not switch to the ground level until after time period T4 at which time semiconductor Q17 is conductive and the voltage at node E is at ground level due to the operation of stage QC. Again, due to the operation of semiconductor Q17 in response to the $\phi 2$ signal at time period T8, the −V level of signal S4($\phi 1$) is transmitted to terminal 51. This type of operation is repeated again between time periods T12 and the end of the diagram. Moreover, the signal at terminal 51 remains a binary 0 after time period T16 inasmuch as the (S4($\phi 1$) signal is a binary 0 signal during the $\phi 2$ "sampling" period (i.e. when the $\phi 2$ signal is at the −V level) initiated at time period T16.

By comparing the signals applied at output terminals 50 and 51, it is seen that complementary output signals are produced. Moreover, the complementary signals are produced in a ratioless MOS technology formate using two-phase circuitry. More importantly, the complementary signals are produced substantially concurrently during any particular phase of operation.

Figure 3:
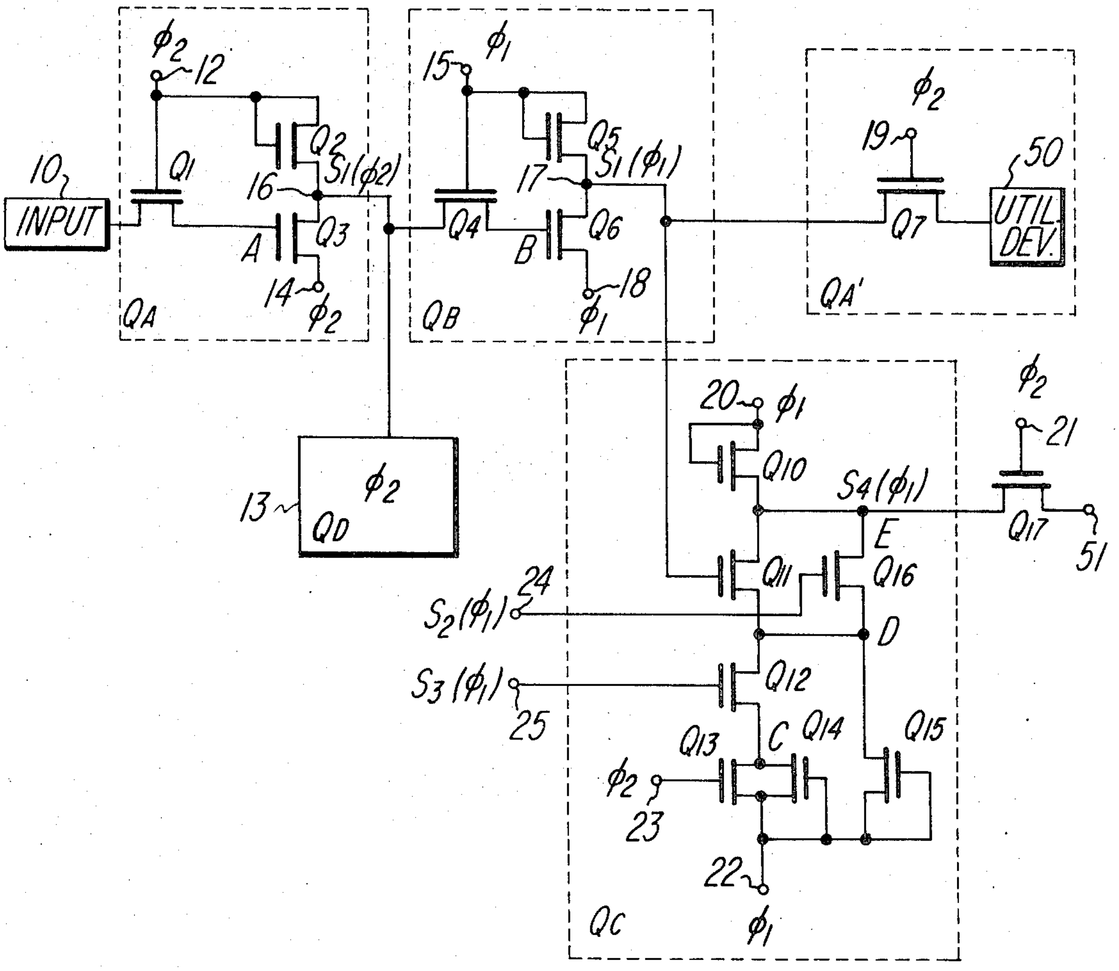
FIG. 3 is a schematic diagram of another embodiment of the instant invention.

Referring now to FIG. 3, there is shown a schematic diagram of another embodiment of the instant invention. As suggested supra, the instant invention is adaptable to an application of combinational logic or the like. In FIG. 3, components which are similar to those described supra, bear similar reference numerals. Thus, stages QA and QB are the $\phi 2$ and $\phi 1$ stages, respectively. However, stage QC now includes semiconductors Q12, Q15 and Q16 and suggest one combinational logic configuration. In this circuit, semiconductor Q12 is connected in series with the parallel combination of semiconductors Q11 and Q16. This configuration essentially effects an AND type logic operation between semiconductors Q11 and Q12. In the alternative (i.e., OR logic operation) an AND function between semiconductors Q12 and Q16 is provided. Semiconductors Q16 and Q15 are connected in series between the $\phi 1$ terminal 22 and node E. Semiconductor Q15 provides a precharging function relative to node D which is analogous to the precharging operation of semiconductors Q10 and Q14.

A detailed timing diagram and analysis of this combinational logic circuit is deemed unnecessary especially since the logic function performed is illustrative only. However, it is apparent that the voltage signal at node C is applied to node E, only if semiconductors Q11 AND Q12 are both rendered conductive, OR, if semiconductors Q12 AND Q16 are both conductive. Consequently, the signals S1($\phi 1$) and S3($\phi 1$) or the signals S2($\phi 1$) and S3($\phi 1$) must both be −V level signals. Of course, if all input signals are at the −V level, the output signal S4($\phi 1$) at node E will be determined by the signal at node C. Thus, the circuit of stage QC performs the logic function:

$$S4(\phi 1) = S2(\phi 1) \cdot S3(\phi 1) + S3(\phi 1) \cdot S1(\phi 1)$$

and produces the signal S4($\phi 1$) in accordance with the phase relationships noted above.

Thus, there has been described a circuit wherein complementary signals can be produced during a single phase time. A delay of a phase time is not required. In the description, certain polarity conditions are suggested. Obviously, the polarity can be reversed by proper changes throughout the circuit. For example, the utilization of P-MOS devices is illustrative only and not limitative of the invention. In fact, bipolar transistors or other devices can be used in implementing this circuit. Therefore, any changes which are suggested to those skilled in the art are intended to be included in this description.

What is claimed is:

1. A logic circuit comprising:

first gate means having input and output terminals;

first control signal supplying means connected to said first gate means to control operation thereof;

second gate means having input and output terminals;

said input terminal of said second gate means connected to said output terminal of said first gate means; and second control signal supplying means for supplying signals out-of-phase with said first control signal supplying means;

said second gate means includes first, second, third and fourth semiconductor devices of the same conductivity type and each having a conduction path and a control electrode for controlling the conduction of said conduction path;

said first and second semiconductor devices having the conduction paths thereof connected in parallel with each other;

said third and fourth semiconductor devices having the conduction paths thereof connected together in series and said third semiconductor device connected directly in series with the parallel connected conduction paths of said first and second semiconductor devices;

the opposite ends of the series circuit comprising the series connected conduction paths connected to said first control signal supplying means;

said control electrodes of said second and fourth semiconductor devices connected to said first control signal supplying means;

said control electrode of said first semiconductor device connected to said second control signal supplying means;

said control electrode of said third semiconductor device connected to said output terminal of said first gate means;

said output terminal of said second gate means connected to the common junction of the conduction paths of said third and fourth semiconductor devices; and said first and second gate means producing complementary output signals at the output terminals thereof.

2. The logic circuit recited in claim 1 wherein said first gate means includes fifth, sixth, and seventh semiconductor devices of the same conductivity type as said first semiconductor device;

each of said semiconductor devices having a conduction path and a control electrode for controlling the conduction of the conduction path;

said fifth and sixth semiconductor devices having the conduction paths thereof connected in series;

said output terminal connected to the common junction of the conduction paths of said fifth and sixth semiconductor devices;

the opposite ends of the series connected conduction paths connected to said first control signal supplying means;

said seventh semiconductor device having the conduction path thereof connected from said input terminal to said control electrode of said sixth semiconductor device to supply signals from said input terminal to the control electrode of said sixth semiconductor device when said seventh semiconductor device is conductive; and the control electrodes of said fifth and seventh semiconductor devices connected together and to said first control signal supplying means.

3. The logic circuit recited in claim 1 including a pair of output gate means:

each of said output gate means including one semiconductor device having a conduction path and a control electrode for controlling the conduction of said conduction path;

each of said semiconductors having the conduction path thereof connected from a different one of the output terminals of said first and second gate means to a different output device; and each of said semiconductors having the control electrode thereof connected to said second control signal supplying means so that signals are transferred from said first and second gate means to said output devices in synchronism according to the signal supplied by said second control signal supplying means.

4. The logic circuit recited in claim 1 wherein said second gate means includes eighth, ninth, and tenth semiconductor devices of the same conductivity type as said first semiconductor device and each having a conduction path and a control electrode for controlling the conduction of said conduction path;

said eighth semiconductor device having the conduction path thereof connected in series between the conduction paths of said third and second semiconductor devices;

said ninth and tenth semiconductor devices having the conduction paths thereof connected in series in the order presented from said first control signal supplying means to said output terminal of said second gate means, whereby said series connected conduction paths of said ninth and tenth semiconductor devices are effectively in parallel with the series connected conduction paths of said first, third and eight semiconductor devices;

the control electrode of said ninth semiconductor device connected to said first control signal supplying means;

input means connected to the control electrodes of said eighth and tenth semiconductor devices; and means interconnecting the series connected conduction paths to produce a gating function which is controlled by the signals supplied thereto by said input means and said first gate means.

5. A logic circuit including:

first and second clock signal sources for producing clock signals of different phase relation;

first semiconductor means connected to said first clock signal source and for charging an output node to a predetermined condition in response to a clock signal of one level from said first clock signal source;

second semiconductor means connected to said first clock signal source and for charging an intermediate node to a predetermined condition in response to a clock signal of said one level from said first clock signal source;

third semiconductor means connected to both of said first first and second clock signal sources and for charging said intermediate node to a different predetermined condition in response to a clock signal of a second level from said first clock signal source and a clock signal of one level from said second clock signal source; and fourth semiconductor means connected between said intermediate node and said output node to selectively effect a signal transfer therebetween as a function of the control signal supplied to said fourth semiconductor.

* * * * *